J. B. HAMILTON.
DITCHER.
APPLICATION FILED JULY 22, 1915.
1,233,874.
Patented July 17, 1917.
2 SHEETS—SHEET 2.
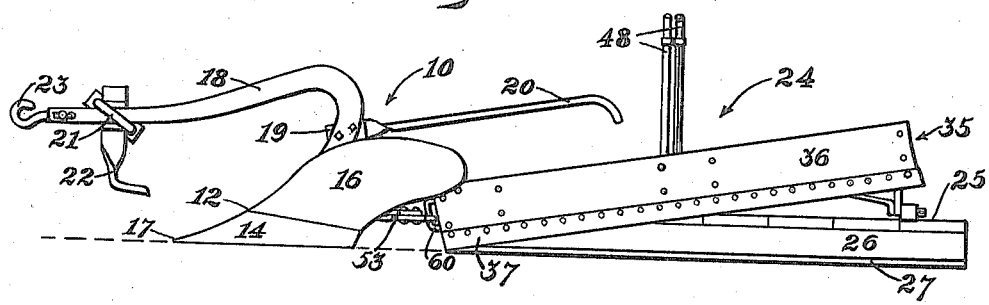
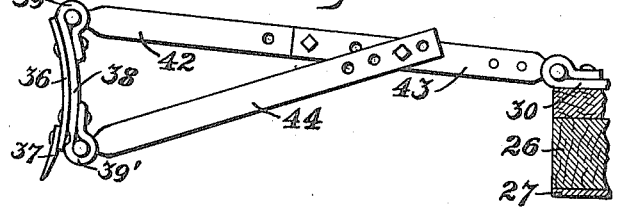
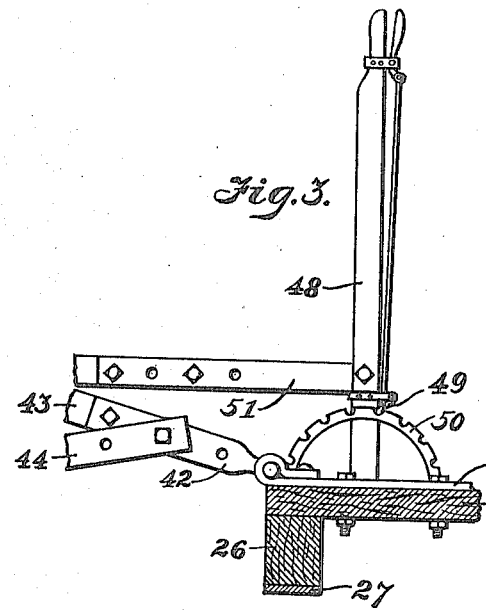
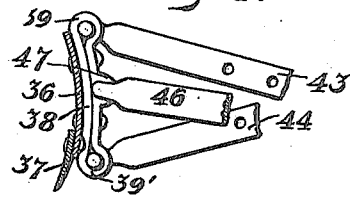
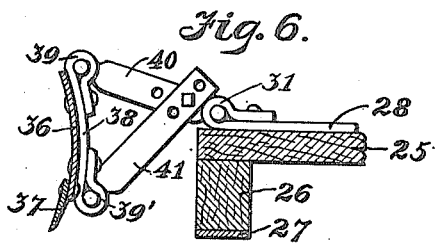
Inventor
James B. Hamilton
by Hazard, Berry & Miller
attys.

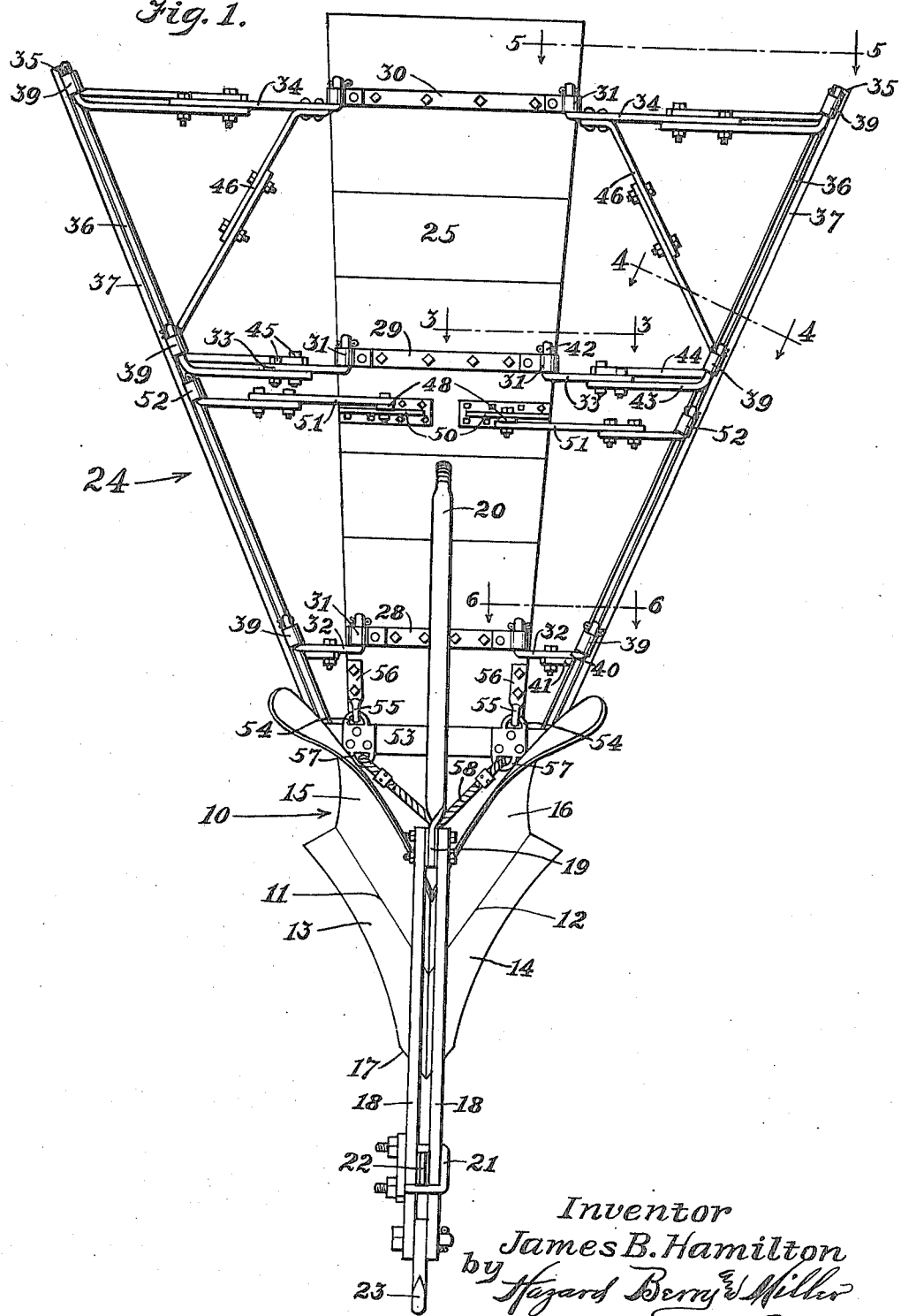

_UNITED STATES PATENT OFFICE._

JAMES BENTON HAMILTON, OF IMPERIAL, CALIFORNIA.

DITCHER.

1,233,874.  Specification of Letters Patent.  Patented July 17, 1917.

Application filed July 22, 1915. Serial No. 41,290.

_To all whom it may concern:_

Be it known that I, JAMES BENTON HAMILTON, a citizen of the United States, residing at Imperial, county of Imperial, and State of California, have invented a new and useful Ditcher, of which the following is a specification.

My invention relates to a machine for constructing new ditches, for cleaning out ditches which have become more or less choked with silt or vegetation, and for various other purposes.

It is an object of this invention to construct a machine which consists of a plow or earth cutting member and a distributing member coöperating therewith and which distributes the earth and vegetation up along the levees of the ditch, bringing the sides of the ditch to an even slope, and smoothing them off.

It is another object of this invention to construct a machine of the kind referred to, comprising a platform from which the plow may be controlled and the distributing member may be adjusted to vary the inclination of the ditch. The distributing member consists of a pair of wings arranged in the shape of a V with the apex toward the digging member. Means are provided for varying the angle of divergence of said distributing members and also the inclination of each distributing member from a vertical plane.

It is another object of this invention to construct a machine of the kind referred to which is durable, simple of construction, easily operated and not liable to get out of order.

With the above and other objects in view which will appear as the description proceeds, my invention consists in the construction, arrangement and combination of parts hereinafter described and claimed.

In the accompanying drawings which form a part of this specification, I have illustrated a convenient and practical embodiment of my invention, and in which:

Figure 1 is a plan view of my improved ditch digging and cleaning machine.

Fig. 2 is a side elevation thereof.

Fig. 3 is a vertical section taken on line 3—3, Fig. 1, showing the arrangement of the wing lifting levers.

Figs. 4 and 5 are detail views taken on lines 4—4 and 5—5, respectively of Fig. 1, showing the attachment of the wing supporting arms to the wing members.

Fig. 6 is a detail view showing the manner in which the wing supporting arms are adjusted.

The earth digging or cutting member 10 is composed of a double mold board plow, 11. 13 and 14 designate the plow shares and 15 and 16 the mold boards of said plows and 17 designates a cutting edge in front. The plow beams 18, 18, are slightly spaced from each other, allowing the shoe 19 of a plow handle 20 controlling plow to be secured thereto. Near the forward end of the beams 18, 18, a U-shaped bolt 21 holds in place a gage runner 22 consisting of a piece of steel or iron and shaped as shown in Fig. 2. This gage runner 22 is made adjustable, and serves to keep the nose of the plow from dipping too deep into the earth, whereby the depth of the furrow may be controlled. A hook 23 mounted in front of the beams 18 is provided whereby the digging member 10 may be drawn or pulled by any suitable means.

The distributing member 24 of the apparatus comprises a longitudinal horizontal platform 25 arranged in alinement with the earth cutting member 10. The platform is built up of timber and iron and is well braced, and tapers toward the front end, the width of the rear end being of a suitable dimension so as to bear well down in the furrow made by the plow. This platform may be of any length but is preferably made about three times as long as the width thereof at the rear end, and is provided under its sides with a pair of runners 26, 26 which are preferably equipped with strips of iron 27 running the whole length thereof, to prevent excessive wear. Securely bolted to the platform 25 are three heavy transverse iron strips, 28, 29 and 30, designating the forward, the intermediate and the rear strips. Each strip is provided at its ends with upstanding eyes or bearings 31 adapted to receive the bent ends of distributing wing supporting arms. 32 designates supporting arms pivoted to the strip 28, 33 the arms pivoted to the strip 29, and 34 the arms pivoted to the strip 30.

The distributing wings 35 consist of a pair of outwardly concave blades 36 having suitably secured thereto at its lower edge, a cutting member 37 running the length thereof. The wing members 35 are provided on their inner faces with upright strips of iron 38 provided at their upper and lower ends with eyes 39 and 39' for the reception of the supporting arms, presently to be described. The supporting arm 32 consists of an upper member 40 connected to the eye 31 of the strip 28 and the upper eye 39 of the wing 35. Intermediate its length, a second arm 41 is bolted thereto whose outer end is connected to the lower eye 39' on the wing 35. The inner ends of the members 40, 41 are provided with a plurality of apertures (see Fig. 6), allowing of adjustment relative to each other. The construction of the supporting arms 33 and 34 is exactly alike. It will therefore be sufficient to describe but one. Referring to the supporting arm 33, the same consists of one platform engaging member 42 pivoted to an eye 31 of the strip 29. An upper wing-engaging member 43 is connected to member 33 and to an upper eye 39 on the wing 35, and a lower wing engaging member 44 connected to a lower eye 39' of the wing 35. The inner ends of the members 42, 43 and 44 are provided with apertures for the reception of bolts 45 holding the arm members 42, 43, 44 rigidly together. These members of the supporting arms allow of the angular adjustment of the wing 35, both in a vertical and a horizontal plane, so that the angle of divergence of wings 35 with each other, and of each wing to a vertical plane may be adjusted in accordance with the requirements of the work to be done. A pair of diagonal braces 46 are fastened to the inner ends of the supporting arms 34 and to an eye 47 formed in the middle of the strip 38 to which the supporting arms 33 are connected.

In front of the intermediate strip 29 is a pair of wing lifting levers 48 pivoted at the floor of the platform 25 and provided with an ordinary lever catch 49 engaging a quadrant 50. Each lever is connected to an adjustable wing lifting arm 51 whose outer end is connected to an eye 52 secured at the upper edge of the wing 35. These levers are movable in a vertical plane transverse to the platform 25, as clearly shown in Fig. 1. At the forward end is a pull bar 53 provided with eyes 54 which are engaged by eyes 55 formed at the outer end of strips 56, the latter being securely bolted to the platform 25. At the forward end of the pull bar 53 are a pair of eyes 57 adapted to be engaged by cables 58 whereby the earth distributing member 24 may be pulled independently of the digging member 10. At the extreme ends of the pull bar 53, lateral hooks are provided which engage a hook member 60, attached to the forward end of the wings 35, and which allow said wing members to move vertically in relation thereto.

From the foregoing description, the operation of the apparatus will be easily understood. The earth cutting member 10 is drawn by any suitable means and is controlled by the operating handle 20. The adjustable shoe 22 extending downwardly from the beams 18 controls the depth to which the nose of the digging member may be depressed into the earth. The earth distributing wings 35 are in substantial alinement with the molding boards of the plows and form therewith a large V-shaped figure. Along the sides of which the earth plowed up by the digging member 10 is gradually and successively pushed rearwardly and upwardly. The angle of divergence of the wings may be increased or diminished by the adjustment of the wing supporting arms 33 and 34. Such adjustment will necessitate a corresponding adjustment of the wing lifting arms 51. The wings themselves may be tilted more or less on a vertical plane by the adjustment of the wing supporting arms 32, 33 and 34. The wings 35 may be further adjusted in vertical relation by the wing lifting levers 48, allowing the raising or lowering of each wing, independently of the other.

It is therefore seen that I have constructed an exceedingly simple machine whereby ditches may be dug and the slope and the size thereof may be made of any desired slant. The apparatus is also suitable for cleaning out irrigation ditches and removing sediment therefrom or vegetation growing therein and along its banks.

While I have shown the preferred form of apparatus as now known to me, it will be understood by those skilled in the art that various changes may be made in the arrangement and construction of parts without departing from the spirit of my invention as defined in the appended claims.

I claim:

1. In a ditch digging and cleaning machine, the combination of a plow and an earth distributing mechanism, said mechanism comprising a pair of concave wings in substantial alinement with the vertical plane of said mold boards, said wings being provided with cutting edges on their lower faces, a horizontal platform, adjustable wing lifting arms pivotally connecting said wings to said platform, means operable from said platform for guiding said plow, and independent manually operated means mounted on said platform for bodily raising or lowering each of said wings.

2. In a ditch digging and cleaning machine, the combination of a plow, means for limiting the downward movement of said plow, and an earth distributing mechanism, said mechanism comprising a pair of concave wings in substantial alinement with the vertical plane of said mold boards, said wings being provided with cutting edges on their lower faces, a platform, runners on the lower sides of said platform, said platform being wider at the rear end than in front, adjustable wing supporting arms pivoted to said wings and to said platform, each of said arms consisting of a plurality of adjustable members, whereby the angle of divergence of said wings toward each other and the inclination of each wing from a vertical plane may be adjusted, and means operable from said platform for guiding said plow, separate manually operated means mounted on said platform for raising or lowering each of said wings.

3. In a ditch digging and cleaning machine, the combination of a plow, and an earth distributing mechanism connected to said plow, said mechanism comprising a pair of wings in substantial alinement with the vertical plane of said mold boards, said wings being provided with cutting edges on their lower faces, a horizontal platform tapered toward the front, runners under said platform, adjustable supporting arms pivotally connecting said wings to said platform, each of said arms comprising a plurality of members adjustably connected together, whereby the angle of divergence of said wings and the tilting of each wing from a vertical plane may be adjusted, means operable from said platform for guiding said plow, and manually operated means mounted on said platform for raising or lowering said wings.

4. In a ditch digging and cleaning machine, the combination of a plow and an earth distributing mechanism connected to said plow, said mechanism comprising a pair of wings extending from said plow in a rearward and outward direction, said wings being provided with cutting edges on their lower faces, a platform between said wings, runners under said platform, supporting arms pivotally connecting said wings to said platform, each of said arms comprising a plurality of adjustable members, whereby the angle of divergence of said wings and the tilting of each from a vertical plane may be adjusted, means for guiding said plow, and independent means for raising or lowering each of said wings.

5. In a ditch digging and cleaning machine, an earth digging means, an earth distributing mechanism connected thereto, said mechanism comprising a pair of wings extending from said earth digging means in a rearward and outward direction, said wings being provided with cutting edges on their lower faces, platform between said wings, means for adjusting the angle of divergence of said wings, means for tilting said wings, means for controlling the operation of said earth digging means, and independent means for separately raising or lowering each of said wings.

6. In a ditch digging and cleaning machine, the combination of an earth cutting means, an earth distributing mechanism connected thereto, said mechanism comprising a pair of wings extending in a rearward and outward direction, a platform, runners under said platform, means for tilting said wings, and independent means for raising or lowering said wings.

7. In a ditch digging and cleaning machine, the combination of an earth cutting means, and an earth distributing mechanism connected thereto, said mechanism comprising a pair of wings extending in a rearward and outward direction therefrom, means for adjusting the angle of divergence of said wings, means for tilting each of said wings in a vertical plane, and independent means for raising or lowering said wings.

8. In a ditch digging and cleaning machine, the combination of an earth cutting means, and an earth distributing mechanism connected thereto, said mechanism comprising a pair of wings extending in a rearward and outward direction, means for adjusting the angle of divergence between said wings, means for tilting said wings and means for lowering or raising said wings.

JAMES BENTON HAMILTON.

Witnesses:
T. E. MANNING,
F. E. McDOUGAL.